United States Patent [19]

Roberg

[11] Patent Number: 5,556,042
[45] Date of Patent: Sep. 17, 1996

[54] COMBINE CHOPPER ATTACHMENT WITH PIVOTAL BROADCAST DISCHARGE CHUTE

[75] Inventor: Alfons Roberg, Hersewinkel, Germany

[73] Assignee: Claas oHG Beschrankt haftende offene Handelsgesellschaft, Harsewinkel, Germany

[21] Appl. No.: 519,024

[22] Filed: Aug. 24, 1995

[30]  Foreign Application Priority Data

Sep. 7, 1994 [DE] Germany ............... 44 31 802.2

[51] Int. Cl.[6] ............... B02C 18/08; B02C 21/02
[52] U.S. Cl. ............... 241/101.76; 241/190; 241/194
[58] Field of Search ............... 241/101.76, 101.761, 241/190, 193, 194; 460/111, 112; 56/16.4 R

[56]  References Cited

U.S. PATENT DOCUMENTS

| | | |
|---|---|---|
| 2,932,145 | 4/1960 | Scranton . |
| 3,015,188 | 1/1962 | Reinecker et al. ............... 241/194 |
| 3,325,106 | 6/1967 | Hoffman, Jr. et al. ............... 241/101.76 X |
| 4,283,904 | 8/1981 | Aron ............... 56/13.9 |
| 4,612,941 | 9/1986 | Kunde ............... 460/112 |
| 4,917,652 | 4/1990 | Glaubitz et al. ............... 460/111 |
| 5,042,973 | 8/1991 | Hamarstrand ............... 460/112 |

FOREIGN PATENT DOCUMENTS

| | | | |
|---|---|---|---|
| 0415419 | 3/1991 | European Pat. Off. ............... 460/112 |
| 1071403 | 6/1960 | Germany . |
| 3529801 | 1/1987 | Germany . |
| 3615151 | 6/1992 | Germany . |

*Primary Examiner*—John M. Husar
*Attorney, Agent, or Firm*—Browdy and Neimark

[57]  ABSTRACT

A straw or chaff chopper attachment for a combine has at least one delivery funnel which can be fixed in place on the outlet hood of the combine, a cup-shaped rotor housing disposed under the delivery funnel, and an ejection chute connected with the rotor housing. The cup-shaped rotor housing is disposed underneath the delivery funnel and is capable of being pivoted back and forth around a vertical pivot axis (6) on a shaft (7). A chopping and ejection unit (8) disposed in the cup-shaped rotor housing (4), which rotates around the shaft (7), which extends coaxially with the vertical pivot axis (6) and chops the material and ejects it at the same time. A pair of the delivery funnels may be coupled for axial rotation about respective vertical pivot axes such that their respective ejection chutes move together. The chopper and ejection unit (8) may include a flat-table turning disk (11) rotatable around the vertical shaft (7), beaters (12) fixed on the turntable (11), flails (13) with cutting edges (13a) freely movable to oscillate, adjustably mounted counter-cutters (14) projecting into the rotor housing (4), and at least one cutter comb (15) to cooperatively act with the flails (13).

12 Claims, 5 Drawing Sheets

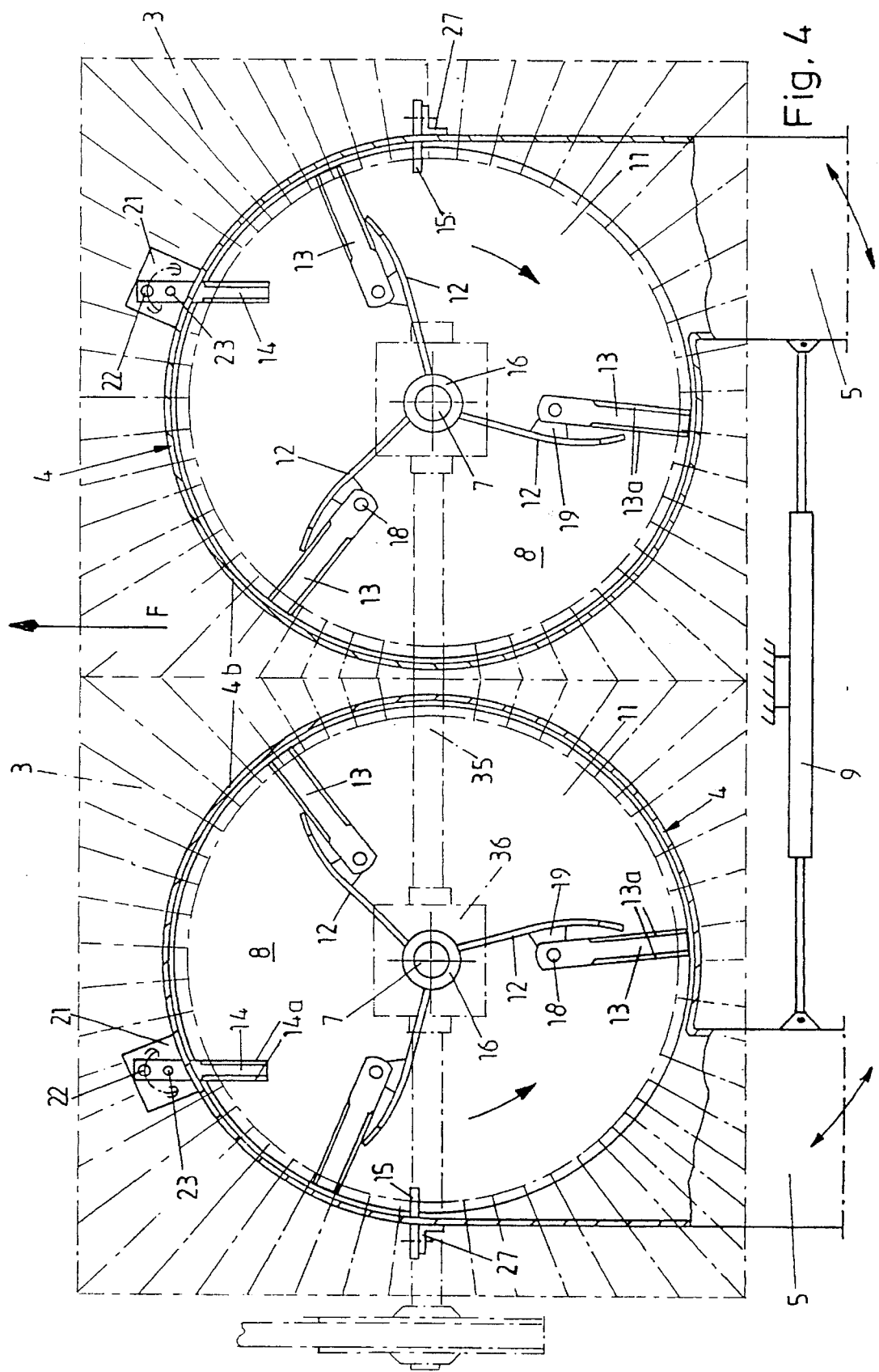

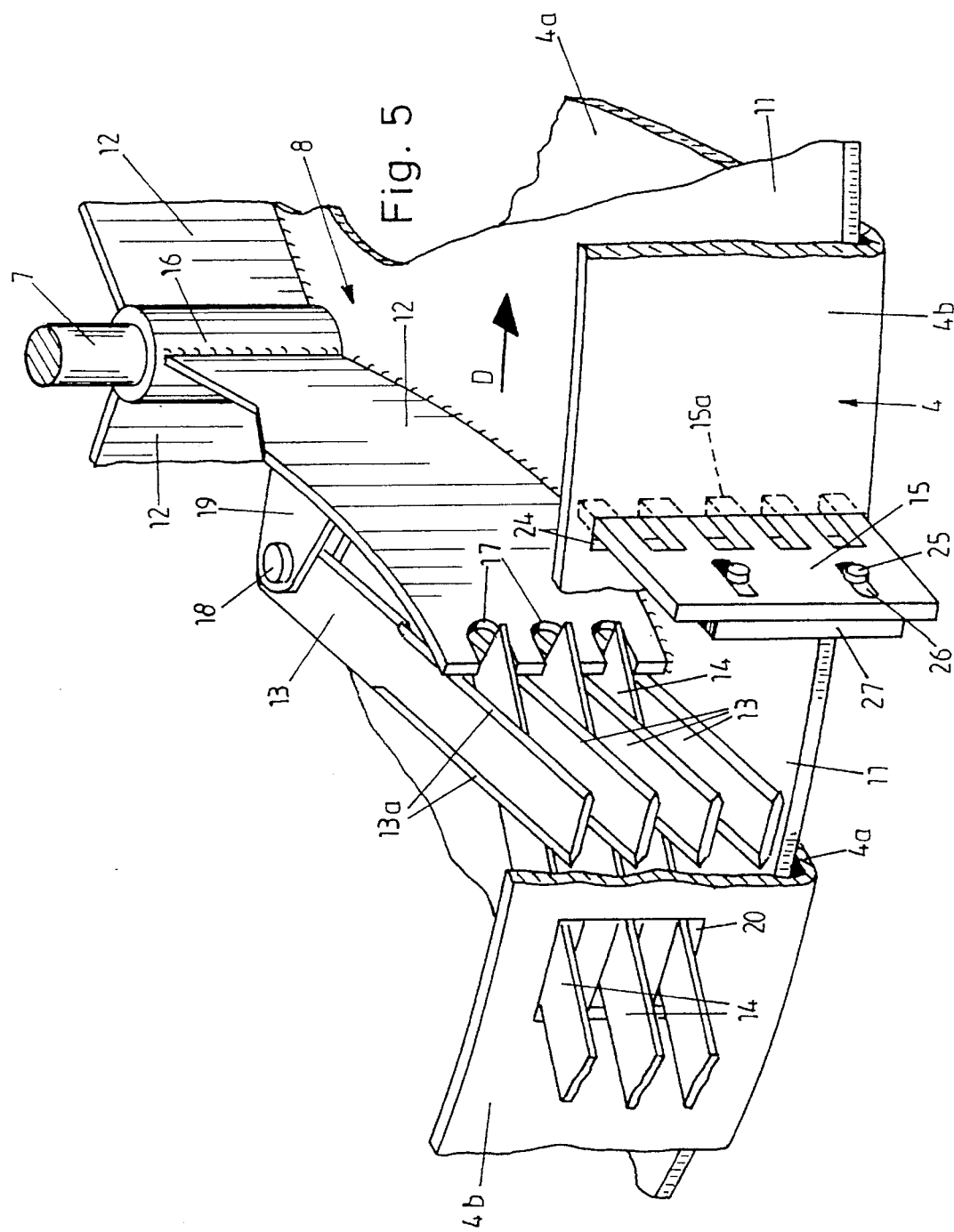

COMBINE CHOPPER ATTACHMENT WITH PIVOTAL BROADCAST DISCHARGE CHUTE

FIELD OF THE INVENTION

The invention relates to a chopper attachment with a broadcast distributing discharge chute for material to be chopped, in particular a straw/chaff mixture for/on a combine with at least one delivery funnel for the material which can be fixed in place on the outlet hood of the combine and with a cup-shaped rotor housing disposed thereunder, having chopper and ejection elements and an ejection chute connected therewith.

REVIEW OF RELATED ART

A chopper attachment of this type is known from U.S. Pat. No. 2,932,145, in which a delivery funnel is disposed below a chopper cylinder and a rotor housing with an ejection chute underneath the chopper cylinder. Cutters are disposed in the rotor housing which simultaneously also constitutes an extractor. However, the rotor housing is fixedly disposed under the funnel by welding, so that the ejection chute cannot be changed for adjustable broadcast distribution.

Furthermore, an ejection blower with a fixed ejection chute placed underneath a chopper is known from German Patent DE-PS 36 15 151, wherein the chopped material can only be ejected over a fixed width and a lateral adjustment is not possible.

German Patent DE-PS 35 29 801 also discloses a device for combines for distributing chaff and for the ejection of chopped material, in particular straw, wherein a chopper is disposed in a funnel, which chops the material up and moves it to a fixedly disposed ejection chute, so that here, too, a lateral adjustment in broadcast distribution is impossible.

Finally, German Patent DE-PS 1 071 403 discloses a chopper with an associated blower chute, which is also fixed in place and therefore performs broadcast distribution only in a predetermined manner.

These known devices are constructed comparatively elaborately and their broadcast distribution chutes are insufficient.

OBJECTS AND SUMMARY OF THE INVENTION

It is the object of the invention to improve a chopper attachment constructed in such a way that the chopping, ejection and broadcast distribution of the material are integrated in a simple manner, so that the structure is more compact and simpler and functions optimally.

This object is attained by the present invention.

In the chopper attachment in accordance with the invention the chopper device and the ejection device are integrated into a single tool unit, and this tool unit is disposed in the rotor housing. It is therefore possible to omit the customary chopper disposed above the delivery funnel in the outlet hood.

The tool unit constitutes a cutting and ejection device, so that the straw/chaff mixture falling into the rotor housing is comminuted (chopped) as well as simultaneously conveyed in the direction toward the ejection chute. Furthermore, in an advantageous manner the rotor housing is seated, laterally pivotable by means of a live ring, under the delivery funnel, because of which it is possible to laterally adjust the ejection chute connected to the rotor housing, so that in this way the desired ejection width for the chopped material can be selectively set.

The chopper attachment has become simpler to produce and more cost-effective and has a compact structure because of the device in the rotor housing which simultaneously chops and ejects. This chopper attachment has achieved an optimal function because of the integration of the three functions of chopping, discharging and broadcast adjustment.

It is preferred to dispose two funnels with respectively one rotor housing rotatably seated under them and respectively one chopper and ejection device rotating in them, wherein the two rotor housings are coupled to pivot laterally for setting the broadcast distribution ejection.

BRIEF DESCRIPTION OF THE DRAWING

An exemplary embodiment of the invention is represented in the drawings and will be explained in detail below. Shown are in:

FIG. 4, a top view of two rotor housings coupled with each other for lateral pivoting, with respectively one modular chopper and ejection unit and with delivery funnels indicated by dash- dotted lines. FIG. 4 shows a double-acting pressure cylinder as a movement element;

FIG. 5, a perspective representation of a cutout of the rotor housing with the modular chopper and ejection unit.

DESCRIPTION OF THE PREFERRED EMBODIMENTS

Figure 1:
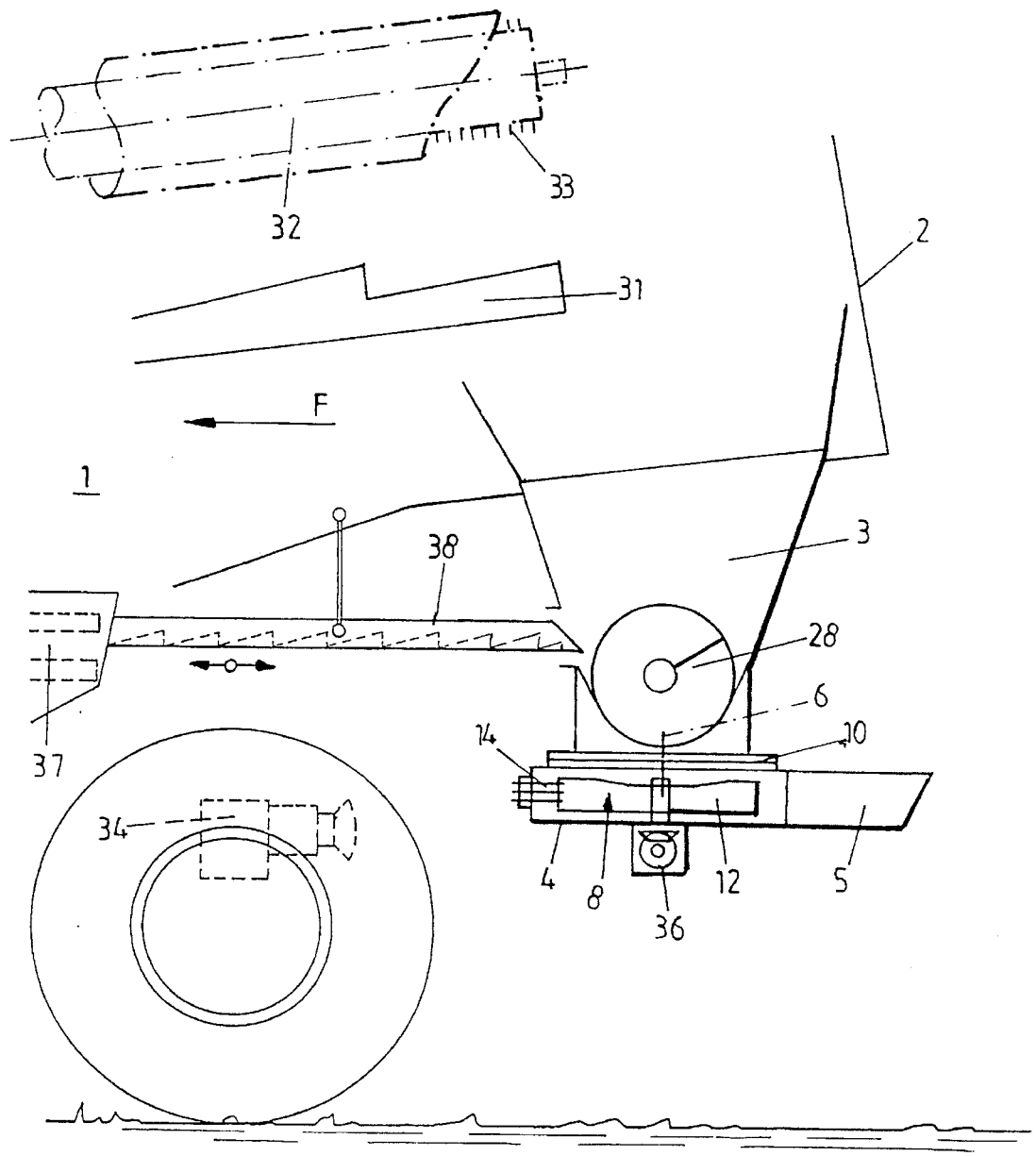
FIG. 1, a schematic lateral view of a combine with a chopper attachment, with a delivery funnel with a worm conveyor, a laterally pivotable rotor with the chopper and ejection unit and ejection chute housing seated under it.

The chopper attachment with a broadcast distributing ejection chute for material to be chopped, in particular a straw/chaff mixture for/on a combine (1) has at least one delivery funnel (3) for the material which can be fixed on the outlet hood (2) and a cup-shaped rotor housing (4) disposed thereunder, with chopper and ejection elements and an ejection chute (5) connected therewith.

The cup-shaped rotor housing (4) is seated, pivotable back and forth around a vertical pivoting axis (6), underneath the delivery funnel (3), and a tool unit (8), embodied as a chopping and ejection device and rotating around a shaft (7) extending coaxially in respect to the pivoting axis (6), which chops and simultaneously conveys the material out, is disposed in the cup-shaped rotor housing (4).

The chopper attachment may have only one delivery funnel (3) with the rotor housing (4) and the tool unit (8), however, preferably two delivery funnels (3) are placed on the lower part of the outlet hood (2), spaced apart from each other, transversely to the movement direction (F) of the combine, below which respectively one cup-shaped rotor housing (4) with the tool unit (8) rotating therein and with the ejection chute (5) is movably seated.

Both rotor housings (4) are coupled with each other in the axial lateral pivot (pivot angle) of their ejection chutes (5) by means of a movement element (9), such as pressure medium cylinders which can be charged on both ends, servo motor and lever rod system or looped belt drive.

Each rotor housing (4) is pivotably seated under the delivery funnel (3) by means of a live ring (10).

Figure 4A:
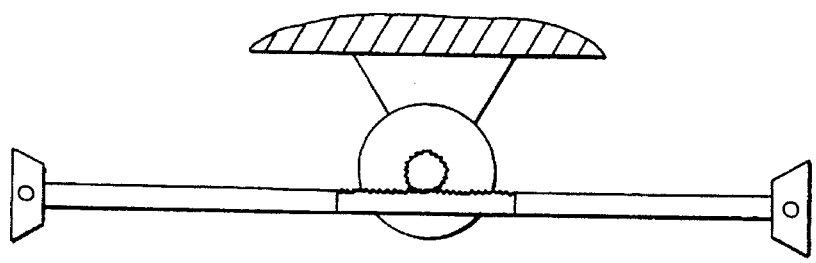
FIG. 4a shows an alternate movement element, a servo motor.
Figure 4B:
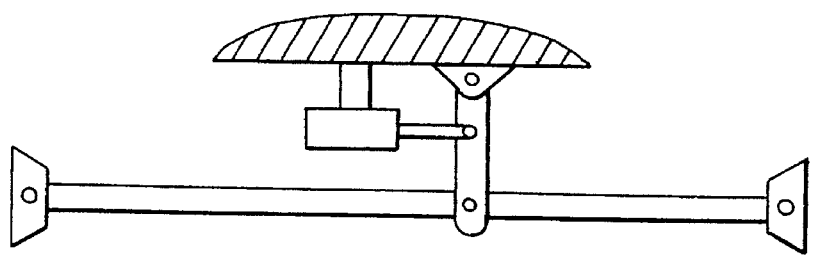
FIG. 4b shows another alternate movement element, a lever rod system.
Figure 4C:
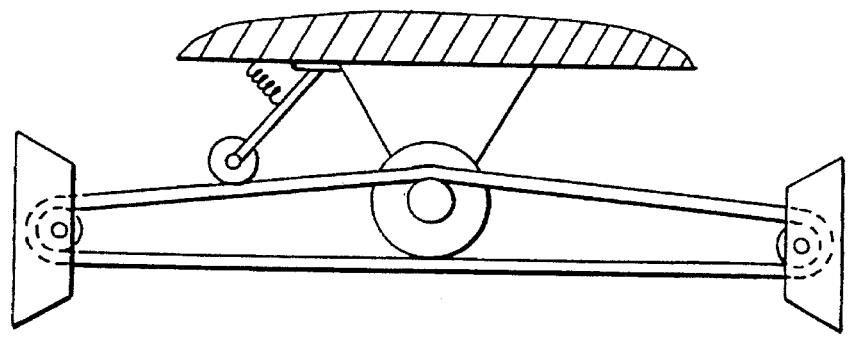
FIG. 4c shows yet another alternate movement element, a looped belt drive.

The chopper and ejection device (8) clearly represented in FIGS. 4 and 5 has a turning disk (turntable) (11) located above the cup bottom (4a) of the rotor housing (4) and rotatable around the vertical shaft (7).

A plurality of beaters (12), extending radially outward from the shaft (7), is fastened on the turntable (11) which is level per se, and a plurality of oscillating, freely movable flails (13) with cutting edges (13a) and disposed above each other, are hinged on each beater (12).

At least one set of counter-cutters (14), disposed above each other, projecting into the rotor housing (4) and cooperating with the flails (13), is adjustably maintained on the cup shell (4b) of the rotor housing (4). Furthermore, at least one cutter comb (15), projecting into the rotor housing (4) and cooperating with the flails (13), is adjustably disposed on the cup shell (4b).

The beaters (12) are constituted of flat strips, which are disposed upended and fastened by welding or the like on a central bearing bush (16) which is rotatable around the vertical shaft (7). In the linear direction the beaters (12) have a shape which is slightly curved oppositely to the direction of rotation (D) and their free long ends terminate spaced apart from the cup shell (4b); the beaters (12) have penetration recesses (17) spaced apart above each other for the counter-cutter (14) on their free ends.

The flails (13) are constituted by flat cutter strips, disposed level, with cutting edges (13a) extending along the two long edges from the free long end as far as short of the hinge on the beaters (12) and are maintained movably in seating brackets (19) by means of respectively one vertical hinge joint (18) on the backside of the beaters, viewed in the direction of rotation (D).

The counter-cutters (14) are constituted by flat cutter strips, disposed level, projecting through a cutout (20) in the cup shell (4b) into the rotor housing (4), with cutting edges (14a) provided on the two long edges, and their angles can be adjusted in steps or continuously around a vertical pivot shaft (23) in or against the direction of rotation of the beaters by means of their long ends projecting out of the cup shell (4b) on bearing bushes (21) fastened on the exterior of the cup shell (4b) by means of screws (22) and holes or elongated holes (FIG. 4).

The cutter comb (15) is disposed upended, projects with its toothed end (15a) through a cutout (24) in the cup shell (4b) into the rotor housing (4) and is maintained, adjustable in the radial direction, on a support strip (27) fastened on the exterior of the cup shell (4b) by means of screws (25) and elongated holes (26).

Figure 2:
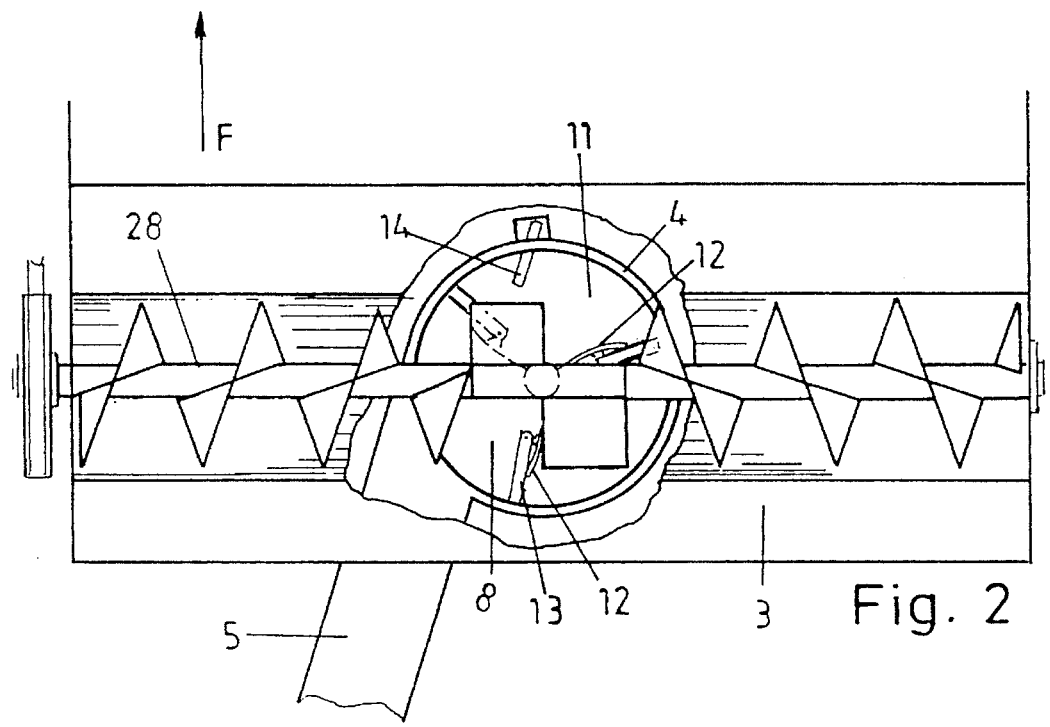
FIG. 2, a top view on the deliver funnel with the horizontal worm conveyor disposed therein and the rotor housing disposed thereunder.

A worm conveyor (28) is horizontally seated in the delivery funnel (3) and has oppositely acting worm turns which convey the material to be chopped from the two long sides of the combine to the rotor housing (4)—FIG. 2—.

Figure 3:
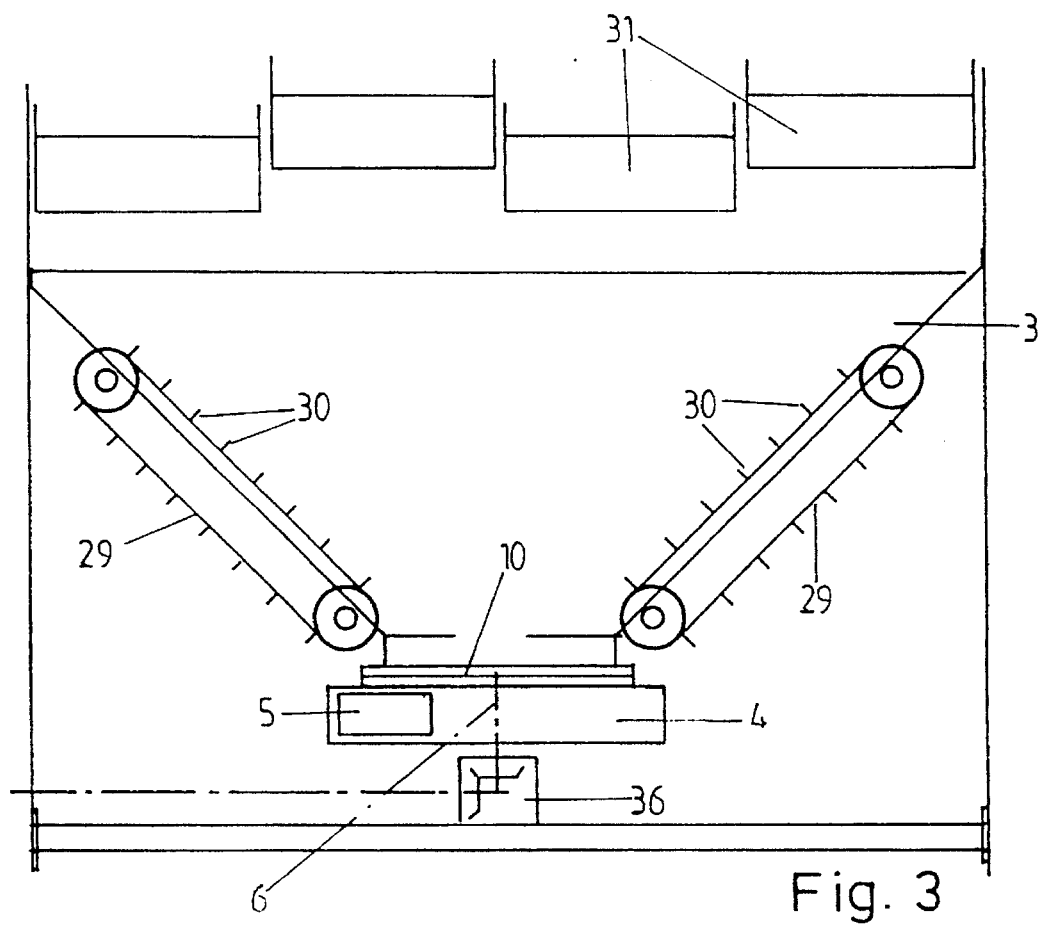
FIG. 3, a rear view of the delivery funnel, with oblique conveyor chains and a rotor housing placed thereunder, disposed underneath a rocker.

In a further embodiment in FIG. 3, two oppositely placed endlessly revolving conveyor chains, belts or the like (29), with carriers (30) for conveying the material to be chopped to the rotor housing (4) and extending obliquely in accordance with the funnel inclination are disposed in the delivery funnel (3).

The delivery funnel (3) is disposed underneath a rocker (31) or an axial chopping device—rotor—with at least one cutter set (33) disposed on its outlet end for pre-chopping the material. The rotating chopping device (32) is shown in dash-dotted lines in FIG. 1.

In a preferred manner each tool unit (8) has three beaters (12) fixed at the same radial distance from each other on the turntable (11), which move the material falling on the turntable (12) in the course of rotation in the rotor housing (4) and convey it in the direction toward the ejection chute (5). In the course of this rotation the freely oscillating flails (13) cooperate with the counter-cutters (14) and chop the material which was tossed by the rotation against the cup shell (4b). The cutter comb (15) exerts a certain amount of retaining effect on the material, which is then further chopped by the flails (13) which also cooperate with the cutter comb (15) and is then expelled through the ejection chute (5) by means of the beaters (12) and flails (13).

Thus, chopping of the material and ejection of the material takes place in the rotor housing (4) by means of a single tool unit (8); the direction of ejection is determined by the angularly adjustable ejection chute (5) by means of the rotatable seating of the rotor housing (4) underneath the funnel (3).

When two rotor housings (4) are disposed, the two tool units (8) perform oppositely directed rotations (FIG. 4).

The tool unit or units (8) are moved by means of a common drive (34) via a shaft (35) of a gear (36) and from there to the bearing bush (16) and rotating shaft (7) of the turntable (11).

As shown in FIG. 1, an input tray (38) coming from the screen box (37) delivers chaff material to the funnel (3).

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A chopper attachment, to be attached to a combine for chopping straw or chaff material, the combine having an outlet hood, the chopper attachment comprising:

at least one delivery funnel which can be fixed in place on the outlet hood of the combine;

a cup-shaped rotor housing disposed under the delivery funnel;

an ejection chute connected with the rotor housing;

wherein the cup-shaped rotor housing is disposed underneath the delivery funnel and is capable of being pivoted back and forth around a vertical pivot axis (6) on a shaft (7);

a chopping and ejection unit (8) disposed in the cup-shaped rotor housing (4), which in use rotates around the shaft (7) extended coaxially with the vertical pivot axis (6) and chops the material and ejects it at the same time.

2. The chopper attachment in accordance with claim 1, including a pair of the delivery funnel disposed in spaced-apart adjacent locations in a line transverse to the combine movement direction (F) at the bottom of the outlet hood (2), both rotor housing of the pair being coupled for axial rotation about respective vertical pivot axes such that respective ejection chutes are moved by means of a movement element (9); and wherein the ejection chutes are aligned in a direction perpendicular to the vertical pivot axis (6) such that the material ejected from the chopping and ejection unit is ejected directly.

3. The chopper attachment according to claim 2, wherein the movement element is remotely actuatable and includes one of a double-acting pressure medium cylinder, a servo motor, a lever rod system, and a looped belt drive.

4. The chopper attachment in accordance with claim 1, wherein the rotor housing (4) is pivotably seated by means of a live ring (10) disposed underneath the delivery funnel (3).

5. The chopper attachment in accordance with claim 1, wherein the chopper and ejection unit (8) includes:

a flat-table turning disk (11) disposed above a cup bottom (4a) of the rotor housing (4), the turning disc being rotatable around the vertical shaft (7);

a plurality of beaters (12) extending radially outward from the shaft (7) and being fixed on the turntable (11);

a plurality of flails (13) having respective cutting edges (13a) disposed above each other and hinged on each beater (12), such that the flails are freely movable to oscillate;

at least one set of counter-cutters (14) adjustably mounted on the cup shell (4b) of the rotor housing (4) so as to be disposed one above another, the counter-cutters projecting into the rotor housing (4) to cooperatively act with the flails (13);

at least one cutter comb (15) adjustably disposed on the cup shell (4b) to project into the rotor housing (4) and to cooperatively act with the flails (13).

6. The chopper attachment in accordance with claim 5, wherein the beaters (12) include flat, upended strips fastened to the turntable (11) and on a central bearing bush (16) of the turntable (11), the strips being slightly curved oppositely to a direction of turning (C) in a linear direction, the strips having free long ends terminating at a distance from the cup shell (4b) and having penetration recesses (17) spaced apart above each other to provice clearance for the counter-cutters (14) at this free end.

7. The chopper attachment in accordance with claim 6, wherein the flails (13) include flat cutter strips levelly disposed and having cutting edges (13a) extending along both long edges thereof from the free long end as far a distance from the hinge at the beaters (12) and are movably maintained by means of respective hinge joints (18) in seating brackets (19) on a trailing beater side which is in the back as viewed in the direction of rotation (D).

8. The chopper attachment in accordance with claim 5, wherein the counter-cutters (14) include flat cutter strips, levelly disposed and projecting through a cutout (20) in a cup shell (4a) of the rotor housing (4) and are angularly adjustable stepwise or continuously around a vertical pivot shaft (23) by means of long ends thereof projecting out of the cup shell (4b) on bearing bushes (21) fastened on the exterior of the cup shell (4b) by screws (22) and elongated holes.

9. The chopper attachment in accordance with claim 5, wherein the cutter comb (15) is vertically disposed and includes a toothed end (15a) projecting through a cutout (24) in a cup shell (4b) into the rotor housing (4) and includes means for adjustment in a radial direction, by screws (25) and elongated holes (26) on a support strip (27) fastened on an exterior of the cup shell (4a).

10. The chopper attachment in accordance with claim 1, including a horizontally seated worm conveyor (28) to convey the material to be chopped to the rotor housing (4) by oppositely acting worm turns, the worm conveyor being disposed in the delivery funnel (3).

11. The chopper attachment in accordance with claim 1, including a conveyor pair, the pair including one of chains and belts (29), located opposite each other and having carriers (30) for conveying the material to be chopped to the rotor housing (4), the conveyor pair being disposed in the delivery funnel (3).

12. The chopper attachment in accordance with claim 1, wherein the delivery funnel (3) is disposed underneath one of a rocker (31) and an axial chipping device (32) provided with at least one cutter set (33) for pre-chopping the material.

* * * * *